(12) United States Patent
Nam et al.

(10) Patent No.: US 12,270,928 B2
(45) Date of Patent: *Apr. 8, 2025

(54) LOCATION MEASURING SYSTEM

(71) Applicant: Landor Architecture, Inc., Seoul (KR)

(72) Inventors: Han Seok Nam, Seoul (KR); James Patten, Brooklyn, NY (US)

(73) Assignee: Landor Architecture, Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,854

(22) Filed: Nov. 8, 2023

(65) Prior Publication Data

US 2024/0077573 A1 Mar. 7, 2024

Related U.S. Application Data

(63) Continuation of application No. 17/451,114, filed on Oct. 15, 2021, now Pat. No. 11,846,718.

(30) Foreign Application Priority Data

Oct. 16, 2020 (KR) .......................... 10-2020-0134685

(51) Int. Cl.
*G01S 5/08* (2006.01)
*G01S 5/02* (2010.01)
*G01S 5/14* (2006.01)

(52) U.S. Cl.
CPC ................ *G01S 5/08* (2013.01); *G01S 5/021* (2013.01); *G01S 5/14* (2013.01)

(58) Field of Classification Search
CPC ............... G01S 5/08; G01S 5/021; G01S 5/14
See application file for complete search history.

(56) References Cited

U.S. PATENT DOCUMENTS 10,401,867 B2 * 9/2019 Strautmann ............ G05D 1/024
11,086,330 B2 8/2021 Tu et al.
(Continued)

FOREIGN PATENT DOCUMENTS

KR 10-2011-0060315 A 6/2011
KR 20110060315 A * 6/2011
(Continued)

OTHER PUBLICATIONS

Office Action of the corresponding Korean Application No. 10-2022-0104068 dated Sep. 21, 2022.
(Continued)

*Primary Examiner* — Muthuswamy G Manoharan
(74) *Attorney, Agent, or Firm* — Knobbe, Martens, Olson & Bear, LLP

(57) ABSTRACT

This application relates to a location measuring system including a driving-type working device. In one aspect, the system includes a data receiving unit that receives marking data about a working surface, a marking unit that executes a marking operation with respect to the working surface corresponding to the marking data, and a scanning unit that scans a target space. The system may also include a scan condition setting unit that sets a movement path of the driving-type working device corresponding to the marking data, sets a scanning position for scanning the target space in consideration of space map data corresponding to the target space, and sets a scan angle of the scanning unit at the scanning position. The system may further include a position detecting unit that compares scan data acquired via the scanning unit with the space map data to detect a position of the driving-type working device.

10 Claims, 18 Drawing Sheets

(56) References Cited

U.S. PATENT DOCUMENTS

| | | | | |
|---|---|---|---|---|
| 2007/0298814 | A1* | 12/2007 | Kim | H04W 64/00 |
| | | | | 455/456.1 |
| 2011/0285593 | A1* | 11/2011 | Cavirani | H01Q 21/065 |
| | | | | 342/457 |
| 2018/0031692 | A1 | 2/2018 | Kuo | |
| 2019/0107606 | A1 | 4/2019 | Russell et al. | |
| 2020/0264603 | A1* | 8/2020 | Kwak | A47L 9/2894 |

FOREIGN PATENT DOCUMENTS

| | | | |
|---|---|---|---|
| KR | 10-2018-0090565 A | 8/2018 |
| KR | 10-1966396 B1 | 4/2019 |
| KR | 10-2019-0083243 A | 7/2019 |
| KR | 10-2031348 B1 | 11/2019 |

OTHER PUBLICATIONS

Office Action of the corresponding Korean Application No. 10-2020-0134685 dated Sep. 23, 2021.
Office Action of the corresponding Korean Application No. 10-2020-0134685 dated Mar. 29, 2022.
Office Action of the corresponding Korean Application No. 10-2020-0134685 dated May 18, 2022.
Office Action received in KR Application No. 10-2024-0148762 (a divisional of KR priority application No. 10-2020-0134685) dated Dec. 9, 2024.

\* cited by examiner

LOCATION MEASURING SYSTEM

CROSS-REFERENCE TO RELATED APPLICATIONS

The present application is a continuation of U.S. patent application Ser. No. 17/451,114, filed on Oct. 15, 2021, which claims priority under 35 U.S.C. 119(a) to Korean Patent Application No. 10-2020-0134685, filed on Oct. 16, 2020, the contents of each of which are incorporated herein by reference in their entirety.

BACKGROUND

1. Technical Field

The present disclosure relates to a location measuring system.

2. Description of Related Technology

Limitations and/or problems between a drawing and the actual interpretation appears not only at a construction site of construction and/or civil engineering work, but also in trying to display a specific content on a working surface in general. For example, for an advertisement that is to be displayed on a working surface, the work will undoubtedly depend on the skill of the worker as he/she has to manually display the specific content on the working surface after seeing the original drawing. The work will have poor accuracy and will be even more problematic in a case where the same content needs to be repeatedly displayed. Such problem may occur not only in the construction field, but also in overall fields that require marking according to position measurement, such as a heavy industry field or an urban planning field.

In addition, in a case of performing work by using a machine/robot, the machine/robot may need to pinpoint its exact position by itself.

SUMMARY

The present disclosure provides a location measuring system capable of determining an environment of a target (work) space and allows a driving-type working device to determine its own position more accurately.

According to an embodiment, a location measuring system including a driving-type working device should include: a data transmitting and receiving unit that transmits or receives information on a target space in which the driving-type working device is located; a driving unit that provides power to the driving-type working device; a sensing unit that senses the target space; a position detecting unit that detects a position of the driving-type working device to generate first position data; a correcting unit that corrects a position of at least a portion of the driving-type working device to generate correction data about the position of the driving-type working device; and a position determining unit that generates second position data of the driving-type working device from the first position data and the correction data.

The correcting unit may measure at least one of a distance or an angle to at least one reference point which is located in the target space, and generate the correction data based on the distance.

The correcting unit may track a path of the driving-type working device in the target space, and generate the correction data based on the tracked path data.

The correcting unit may generate a pattern by which the path of the driving-type working device can be tracked in the target space.

It may further provide a path setting unit that sets the movement path of the driving-type working device according to at least one of the first position data or the second position data.

The position detecting unit may compare map data about the target space received by the data transmitting and receiving unit with data about the target space sensed by the sensing unit to generate the first position data.

The driving-type working device may further include at least a first auxiliary sensing unit that senses a sensed body differently from a the sensing unit or a second auxiliary sensing unit that senses a tilting degree formed with the direction the driving-type working device is advancing.

The driving-type working device may further include an accuracy measuring unit that measures the accuracy of the work performed on the working surface in the target space.

The driving-type working device may include a first driving-type working device that works on the first surface in the target space; and a second driving-type working device that works on the second surface opposite to the first surface in the target space. The second driving-type working device may be provided so that it can work by recognizing the work of the first driving-type working device.

The present disclosure may provide the location measuring system capable of determining an environment of the target space or the working target space and determining its own position more accurately.

BRIEF DESCRIPTION OF THE DRAWINGS

Various embodiments of the present disclosure will become more apparent in view of the attached drawings and accompanying detailed description.

DETAILED DESCRIPTION

Advantages and features of the present disclosure, and methods of achieving them will become apparent with reference to the detailed description in conjunction with the accompanying drawings. However, the present disclosure is not limited to the embodiments presented below, and may be implemented in various different forms, and should be understood to include all transformations, equivalents, and substitutes included in the spirit and scope of the present disclosure. The embodiments presented below are provided to complete the present disclosure, and to completely inform those of ordinary skill in the art to which the present disclosure pertains to the scope of the present disclosure. In describing the present disclosure, if it is determined that a detailed description of a related known technology may obscure the gist of the present disclosure, and hence the detailed description thereof will be omitted.

The terms used in the present application are only used to describe specific embodiments and therefore are not intended to limit the present disclosure. The singular expression includes the plural expressions unless the context clearly dictates otherwise. In the present application, it should be understood that terms such as "include" or "have" are intended to designate that a feature, a number, a step, an operation, a component, a part, or a combination thereof described in the specification exists, but this does not preclude the existence or addition of one or more other features, numbers, steps, operations, components, parts, or combinations thereof. Terms such as first and second may be used to describe various elements, but the elements should not be limited by the terms. The above terms are used only for the purpose of distinguishing one component from another.

Figure 1:
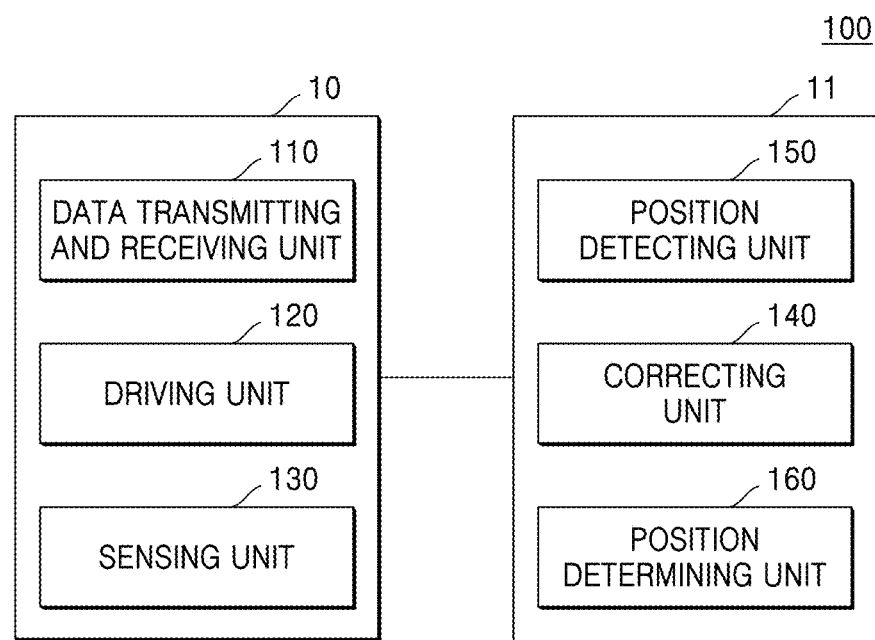
FIG. 1 is a diagram schematically illustrating the configuration of a location measuring system according to an embodiment of the present disclosure.

FIG. 1 is a diagram schematically illustrating the configuration of a location measuring system according to an embodiment of the present disclosure.

Referring to FIG. 1, the location measuring system 100 according to an embodiment of the present disclosure may include a driving-type working device 10 and a computing device 11.

According to an embodiment, the driving-type working device 10 may include a data transmitting and receiving unit (or a data transmitter and receiver) 110, a driving unit (or a driver) 120, and a sensing unit (or a sensor) 130. The computing device 11 may include a position detecting unit (or a position detector) 150, a position determining unit (or a position determining processor) 160, and a correcting unit (or a correcting processor) 140. FIG. 1 illustrates that the position detecting unit 150, the position determining unit 160, and the correcting unit 140 are separately included in the computing device 11, driving-type working device 10 which is merely an embodiment, that is to further explain that the present disclosure is not limited to such a configuration. For example, the computing device 11 may be coupled to the driving-type working device 10, and in this case, the position detecting unit 150, the position determining unit 160, and the correcting unit 140 may function as elements of the driving-type working device 10.

The data transmitting and receiving unit 110 transmits and/or receives information on a target space where the driving-type working device 10 is operating. The target space may mean a space in which the driving-type working device 10 performs work. The information that is received by the data transmitting and receiving unit 110 may include information on a drawing corresponding to the target space, such as position, size of a wall, a pole, a window, and the like which are present in the target space. In addition, the data transmitting and receiving unit 110 may transmit and/or receive information on the work and/or task to be performed by the driving-type working device 10 in the target space.

On the other hand, the information on the target space may include information on an allowable movement range of the driving-type working device 10. For example, the target space may include a space in which a wall, a pole, or a window may have to be installed. There may be a space, which the driving-type working device 10 should be prevented from entering before the installation. A floor surface of a space, in which the wall has to stand or an elevator has to be installed, may be excluded prior to actual work, and in some cases, there may be a risk that the driving-type working device 10 may fall.

Thus, information on the target space may include information on the allowable movement range to limit the movement range of the driving-type working device 10.

The data transmitting and receiving unit 110 may include a terminal to which an external storage medium such as a USB and a CD-ROM may be connected, and receive data regarding the target space which is stored in the external storage medium. Optionally, the data transmitting and receiving unit 110 may be electrically connected to a separate input unit (not illustrated) to receive data regarding the target space, which is input from the input unit. Optionally, the data transmitting and receiving unit 110 may connected to a separate external computing device via a wired/wireless communication network so that the external computing device may calculate data of the space targeted for work, path data, and/or tracking data, and then transmit the data to the driving-type working device 10 and/or the computing device 11 via the data transmitting and receiving unit 110. Due to this, it is possible to prevent overloading the data processing operation of the driving-type working device 10 and/or the computing device 11. For example, an image acquired by a video device attached to the driving-type working device 10 may be transmitted to the external computing device, then the external computing device may process the image to make path data, and then the path data may be transmitted again to the driving-type working device 10 and/or the computing device 11 via the data transmitting and receiving unit 110.

The driving unit 120 provides power to the driving-type working device 10. The driving unit 120 may be in any form to give mobility to provide power to the driving-type working device 10 and for example, the driving unit 120 may include a wheel or a caterpillar, a blade or a propeller.

The driving unit 120 may include a mechanism for performing a mechanical operation of a component of the driving-type working device 10, as well as a mechanism for giving mobility of the whole driving-type working device 10. For example, the driving unit 120 may include a device responsible for operating and/or moving the working unit of the driving-type working device 10.

The sensing unit 130 may sense the target space. According to an embodiment, the sensing unit 130 may include a sensor and a driving unit such as a motor for controlling a rotation of the sensor, but is not necessarily limited this, and may not include the driving unit such as the motor in a case where the sensing range of the sensor is sufficient to sense the target space.

As for the sensor, there are various types of sensors capable of sensing the target space that may be used. For example, a distance to an object may be measured, a shape of the object may be sensed, or a movement of the driving-type working device 10 may be sensed. These sensors may include a sensor using a laser, sound waves, light waves, and/or radio waves, a gyro sensor, an IMU sensor, a GPS sensor, and/or a video acquisition sensor such as a camera, that may acquire a moving and/or a still image. In addition, the sensing unit 130 may also include an encoder coupled to the driving unit 120, and thereby the number of rotations of a wheel of the driving unit 120 may be measured. In a case where the sensor includes a laser sensor, a lidar (LiDAR) sensor may be included as an example of the laser sensor. In addition, a laser distance measuring sensor may be included as another example of the laser sensor.

The sensing unit 130 may include at least one of these sensors and the sensing accuracy may be improved by combining different types of multiple sensors. For example, the lidar sensor is used as the laser sensor and the gyro sensor and/or the encoder is included to further increase sensing accuracy by sensing the movement of the driving-type working device 10. A configuration of the sensing unit 130 may be applied to all embodiments of the present specification.

The driving-type working device 10 may use the sensing unit 130, to sense the surrounding space, for example, through the laser sensor, and use the information obtained by reflecting a signal output from the sensor to acquire the position of an object in the surrounding space in a polar coordinate format. According to an optional embodiment, the motor connected to the sensor may rotate the sensor by a desired angle, for example, 360°. A rotation direction of the sensor may be controlled variously as needed.

In the sensor, the horizontal rotation, the horizontal movement, the tilt, the vertical rotation and/or the vertical movement may be controlled by a separate driving unit. The horizontal rotation, the horizontal movement, the tilt, the vertical rotation and/or the vertical movement of the sensor may be controlled independently of each other. Control signals for controlling the horizontal rotation, the horizontal movement, the tilt, the vertical rotation and/or the vertical movement may also be generated independently, and be provided to the driving unit.

The position detecting unit 150 detects the position of the driving-type working device 10 using at least one sensor of the sensing unit 130 and generates first position data therefrom. According to an embodiment, the position detecting unit 150 may set a sensing position of the driving-type working device 10 and a sensing angle of the sensing unit 130.

According to an embodiment, the position detecting unit 150 may generate the first position data based on the sensing data of the target space sensed by using the lidar sensor of the sensing unit 130.

Optionally, according to an embodiment, an initial movement path of the driving-type working device 10 may be set based on the information on the target space received via the data transmitting and receiving unit 110. The initial movement path may be set by the position detecting unit 150 in consideration of various elements around the target space, such as structures of various objects, the structure of a wall surface, and the position of a window. In addition, the initial movement path may be set based on the information on the target space with consideration to the amount of data to be sensed by the sensing unit 130. That is, the initial movement path may be set based on a position from which the most sensing data will be obtained and/or a position from which more accurate sensing data will be obtained.

The position detecting unit 150 may designate an arbitrary point on the initial movement path and set the point as a sensing position. In addition, the sensing position may be set to multiple positions if necessary, according to the target space. Correspondingly, when the driving-type working device 10 reaches the sensing position, the sensor performs a sensing operation, for example, a scanning operation. In this case, optionally, the sensor may be rotated according to the sensing angle set by the position detecting unit 150. However, the present disclosure is not necessarily limited to this, and the sensing range may be set by the movement of the driving-type working device 10 itself without rotating the sensor.

On the other hand, in another embodiment of the present disclosure, the sensing height of the sensor may be adjusted and the position detecting unit 150 may set the sensing angle and the sensing height of the sensor at the set sensing position. In addition, the sensing position and the sensing angle may be set in consideration of features of the target space.

In addition, in a case where it is difficult to acquire the sensing data such as the sensing signal being transmitted without reflection, the sensing position and the sensing angle may be disposed in a vacant space within the target space to be set at a position and an angle at which the pole or obstruction may be sensed.

On the other hand, in a case where the drawing of the target space exists, the position detecting unit 150 may set the sensing position and the sensing angle of the sensor at the sensing position on the initial movement path in consideration of the drawing. The position detecting unit 150 may generate space map data corresponding to the target space, and may set the sensing position within the target space in consideration of the space map data. It also sets the sensing angle of the sensing unit 130 at the sensing position.

The driving-type working device 10 may be understood as performing a sensing operation at a specific position on the movement path. The specific sensing position is designated in order to accurately grasp the position of the driving-type working device 10.

The specific position may be set to positions of a finite number, but is not limited to this, and may continuously perform the sensing operation while moving on the movement path.

On the other hand, the sensing angle means a sensing angle of the sensor at each sensing position and may be expressed in degree or radian unit. In addition, the magnitude of the sensing angle may be expressed based on a specific coordinate axis, for example, the x-axis, or based on the angle of the sensor at a specific point, for example, when the sensing operation at the immediately preceding sensing position ends.

In an embodiment of the present disclosure, the driving-type working device 10 may stop at each sensing position and rotate the sensor and/or the body of the driving-type working device 10 to sense, for example, scan the surrounding space in a stationary state. Alternatively, in another embodiment of the present disclosure, the driving-type working device 10 may not stop at the sensing position and sense the surrounding space via the sensor while moving. The position detecting unit 150 may compare the sensing data acquired via the sensing unit 130 at multiple sensing positions with the space map data to detect the position of the driving-type working device 10 and generate the first position data. The first position data may include position coordinates of the driving-type working device 10 present on the space map data. Optionally, the first position data may include sensing map data about the target space corresponding to the data related to the input space, that is, the space map data, and the position coordinates of the driving-type working device 10 in the sensing map data. Optionally, the space map data may be an initial map to be described later. Accordingly, the position detecting unit 150 may compare the sensing data with the initial map to detect the position of the driving-type working device 10 and generate the first position data.

The initial map (prior map) may be a map including the information on the target space and work data corresponding to the target space. In an embodiment, the initial map may be the input of the drawing data. The initial map may provide information on the target space even before the sensing unit 130 acquires sensing data about the target space sensing unit 130. Since the information on the target space acquired from the initial map may be different from the actual one, the driving-type working device 10 uses a sensor at any point in the target space to generate the space map before the position measurement and/or the indicated work is performed.

The sensing unit 130 may perform the sensing operation on the target space for the purpose of acquiring information on the target space as well as the sensing data about determining the position of the driving-type working device 10, and acquire the sensing data therefrom.

On the other hand, the space map data may be represented as coordinates of the pixels included in the image frame, and the coordinates of the pixels corresponding to the position where the object is present may have different values from the coordinates of the pixels corresponding to an empty position. As described above, the data acquired via the sensor may be acquired in the form of polar coordinates, and when the space map data and the sensing data are compared with each other, the position of the driving-type working device 10 in the target space may be determined. More specifically, the position detecting unit 150 may convert the space map data into data in polar coordinate form, and consistently compare the converted data with the sensing data to determine the position of the driving-type working device 10.

In another embodiment, the position detecting unit 150 may receive a position signal output from a transceiver (not illustrated) installed at an arbitrary position and determine the position of the driving-type working device 10 from the position signal. When the position of the transceiver is determined, the transceiver may determine the position of the driving-type working device 10 based on its own position and generate the determined first position data. The transceiver may be installed indoor and communicate with the driving-type working device 10 to aid for the position determination of the driving-type working device 10. As another example, the transceivers may be installed, for example, at four corners of a building and receive a GPS signal, recognize a coordinate value of the building, and then transmit a new signal based on the coordinate value to aid for the determining the position of the driving-type working device 10.

Alternatively, the position detecting unit 150 may also determine the position of the driving-type working device 10 in consideration of the distance from the driving-type working device 10 to the transceiver, the angle data, and the position information of the transceiver. Optionally, the position detecting unit 150 may sense a position of a marker (not illustrated) installed at an arbitrary position and determine the position of the driving-type working device 10. For example, the position detecting unit 150 may determine the position of the driving-type working device 10 in reverse from an analysis of a position and/or data obtained by sensing the position of the marker.

The process performed by the position detecting unit 150 is for the purpose of accurately determining the position of the driving-type working device 10 as much as possible. The transceiver and/or the marker may be located at an arbitrary position of the target space, for example, at the pole or the wall surface to transmit and receive the position signal and/or display the position thereof.

However, the position of the transceiver and/or the marker is not limited to an arbitrary position inside the sensing target space. For example, in a case where the target space is an open space, the position of the driving-type working device 10 may be tracked even if the transceiver and/or the marker is located outside the target space.

The driving-type working device 10 may include a receiver (not illustrated) capable of receiving the position signal to determine the position of the transceiver that has transmitted the receiver's position signal as well as the distance and/or the angle to the transceiver. The receiver may determine the position of the driving-type working device 10 in consideration of the position signal received from at least one transceiver.

The transceiver may be configured through a signal router or a beacon which can be used in a case where it is not easy to determine the exact position of the driving-type working device 10 by comparing the sensing data with the space map data.

The marker may display a specific color, a shape, or a predetermined number, and the driving-type working device 10 may include recognition means for recognizing the color, the shape, or the number to determine the position of the driving-type working device 10 and generate the first position data. On the other hand, the marker may be displayed so as to be identifiable via a special device such as an ultraviolet camera.

The above-described first position data may be a coordinate value indicating the current position of the driving-type working device 10 in the target space based on the data sensed by the sensing unit 130. However, without limiting the present disclosure, the first position data may be the sensing map data about the target space based on the sensing data. The sensing map data may reflect the whole and/or a part of the target space, or it can be the space map data as described above.

The position detecting unit 150 may consider the speed of the driving-type working device 10 to determine the sensing position. The sensor that continuously performs the sensing operation may acquire more accurate data in a section where the speed of the driving-type working device 10 is slow. Conversely, data acquired in a section where the speed of the driving-type working device 10 is fast may have relatively low accuracy. A simulation for an amount of the data acquisition at all positions on the movement path of the driving-type working device 10 may be performed, but in a case where the amount of calculation is increased, the working speed may be slowed down, so some positions may be set to the sensing positions.

According to another embodiment, the position detecting unit 150 may create the space map data dividing the target space into grids of particular areas. According to an embodiment, the space map data may be created as an occupancy grid map. In this case, the position detecting unit 150 may estimate a possibility that each grid in the space is filled with obstacles. The position detecting unit 150 may select a grid having a high uncertainty from the occupied grid map to move the driving-type working device 10. When enough data has been collected or it is determined that the point cannot be reached, the point may be deleted from a grid list. When the list of the uncertain grids is minimized in such a way, for example, when the uncertain grid list is 0, the exploration for the target space is considered to be completed.

Optionally, the position detecting unit 150 according to another embodiment of the present disclosure may perform an operation of comparing the space map data with the sensing data to determine the position of the driving-type working device 10. Unlike the space map data including the grid data, the sensing data may include data about distance and angle to an object. Accordingly, the position detecting unit 150 may convert the space map data of the grid format into data about the distance and the angle to compare the space map data with the sensing data. For example, positions expressed by coordinates of $(x_{m,i}, y_{m,i})$ and $(x_{m,i}, y_{m,i})$ in space bitmap data may be respectively converted into data in a polar coordinate format of $(\phi_{m,i}, d_{m,i})$ and $(\phi_{m,i}, d_{m,i})$. The polar coordinate data matches the data format of the sensing data. Therefore, the position detecting unit 150 may directly compare the converted space map data with the sensing data, and use a comparison result to determine the position of the driving-type working device 10 and generate the first position data.

The space map data and the sensing data are not respectively limited to the grid form and the polar coordinate form, and the grid form data is not necessarily limited to be converted into the polar coordinate form to compare two sets of data. Accordingly, the space map data and the sensing data may be expressed in data other than the grid format or the polar coordinate format, and it is also possible to compare the two types of data by converting the sensing data to correspond to the format of the space map data.

On the other hand, when the sensing unit 130 acquires the sensing data about the object present in the target space, the position detecting unit 150 compares the distance/angle data corresponding to the sensing data with the converted space map data to determine whether there is matching data. The space map data and/or the sensing data may be converted into digital data, for example, CAD data in a DWG format that may be easily corrected by a user if necessary.

According to the determined result, there may be multiple of matching data, and the position detecting unit 150 compares the multiple sensing data with the converted space map data to improve the accuracy of determining the position for the driving-type working device 10.

The position detecting unit 150 may determine the most reliable position as the position of the driving-type working device 10 by comparing each of the plurality of sensing data with the space map data.

For example, when first to n sensing data are acquired by using the sensing unit 130 at the same position, the position detecting unit 150 may search the space map data corresponding to the first sensing data. As a result of the search, there may be m pieces of space map data corresponding to the first sensing data, and the position detecting unit 150 compares the first sensing data with the m pieces of space map data. If this process is repeated n times, a position at which the first to n sensing data is finally acquired, that is, the position of the driving-type working device 10 may be detected.

In order to detect the position of the driving-type working device 10 by comparing the space map data with the sensing data, the position detecting unit 150 may use the most recently acquired sensing data or the sensing data having the smallest data change.

Optionally, according to another embodiment, the position detecting unit 150 may compare the drawing data input via the data transmitting and receiving unit 110 with the space map data. According to this comparison, it is possible to grasp whether a structure such as a pole or a corner present on the drawing data exists in the actual space. In addition, it is possible to enable the driving-type working device 10 to search for a specific position defined in the drawing data through comparison of the drawing data with the space map data. The drawing data and the space map data may be aligned with each other by searching for corresponding features of such as the corner or a pole. When the drawing data and the space map data are aligned, the position detecting unit 150 may use the space map data and the sensing data (for example, a lidar reading value) to estimate the current position of the driving-type working device 10 based on the drawing data.

On the other hand, in another embodiment of the present disclosure, the space map may be generated from sub-sensing data acquired via a sub-sensing sensor (not illustrated) that is fixedly and/or movably installed in the target space. A plurality of sub-sensing sensors may be used according to features of the target space. The sub-sensing data may be acquired in advance, even if the sensing operation is not performed by the sensing unit 130. The data transmitting and receiving unit 110 may receive the sub-sensing data to generate the space map. Accordingly, the process of generating the space map via the sensing unit 130 at an arbitrary position may be omitted before performing the operation in the target space.

The position detecting unit 150 may set the sensing position and the sensing angle in consideration of the space map generated through the sub-sensing data. In addition, even in a case where it is not easy to acquire the sensing data about the entire space through one sensing operation via the sensing unit 130, an effect, which more easily enables the generation of the space map for the entire space via the sub-sensing sensor, may be provided.

On the other hand, the correcting unit 140 may generate the correction data about the position of the driving-type working device 10. The positional accuracy of the driving-type working device 10 may be further improved by the correction data.

According to an embodiment, when generating the space map by the position detecting unit 150, the correcting unit 140 may receive azimuth data from a gyro sensor of the sensing unit 130 and use the azimuth data to generate the correction data. For example, if there are long time intervals between measurement data values acquired from the gyro sensor, the first position data may be affected by external environmental changes such as earth rotation or temperature change between the time intervals. An error of the first position data may be reduced by inversely calculating and correcting the affected values.

According to another embodiment, the correcting unit 140 may use acceleration data and angular velocity data acquired from the IMU sensor of the sensing unit 130 to calculate a velocity and an attitude angle of the driving-type working device 10.

In addition, according to another embodiment, the correcting unit 140 may receive data about distance moved by driving-type working device 10 from the encoder of the sensing unit 130 to generate the correction data.

The reliability of data acquired from the lidar sensor, the gyro sensor, the IMU sensor, and/or the encoder may be determined in consideration of an error rate indicated in a specification of each device. Thus, a higher reliability value may be assigned to data provided from a device which provides more accurate data than those from other devices. Therefore, it is possible to more accurately detect the position of the driving-type working device 10.

In addition, the reliability value may vary over time. For example, in a case where the driving-type working device 10 is set to move at a speed of 1 m/s, the moving distance of the driving-type working device 10 for 1 second has to be measured as 1 m. In addition, the reliability value for the distance data may be differently applied considering the distance data measured via the encoder for the 1 second and an error rate according to the specification of the encoder.

Assuming a case where the error rate of the encoder is ±1%, in the example described above, the distance data may be expected to be present within a range of 99 cm to 101 cm. Nevertheless, in a case where the distance data is not present within the range of 99 cm to 101 cm, a lower reliability value may be assigned to the distance data. Conversely, as the distance data is closer to 1 m, a higher reliability value may be assigned to the distance data.

Therefore, if the distance data is acquired per second, the reliability value for the distance data may be understood to be updated every second.

On the other hand, in a case where time periods during which the lidar data, the gyro data, the IMU data, and the distance data are acquired are different from each other, the reliability value assigned to each data may be reset to the reliability value based on data having the longest data acquisition period.

For example, the acquisition period of the distance data acquired via the encoder may be the shortest, and the acquisition period of the sensing data acquired via the lidar sensor may be the longest. In this case, the reliability value of the distance data may be updated to the shortest cycle and the reliability value of the sensing data may be updated to the longest period. In addition, at a time point when the sensing data with the longest data acquisition period is acquired, the reliability values for all data may be reset to the initially assigned reliability values.

The first position data and the correction data may be transmitted to the position determining unit 160, and the position determining unit 160 may generate the second position data of the driving-type working device 10 from the first position data and the correction data.

Figure 2:
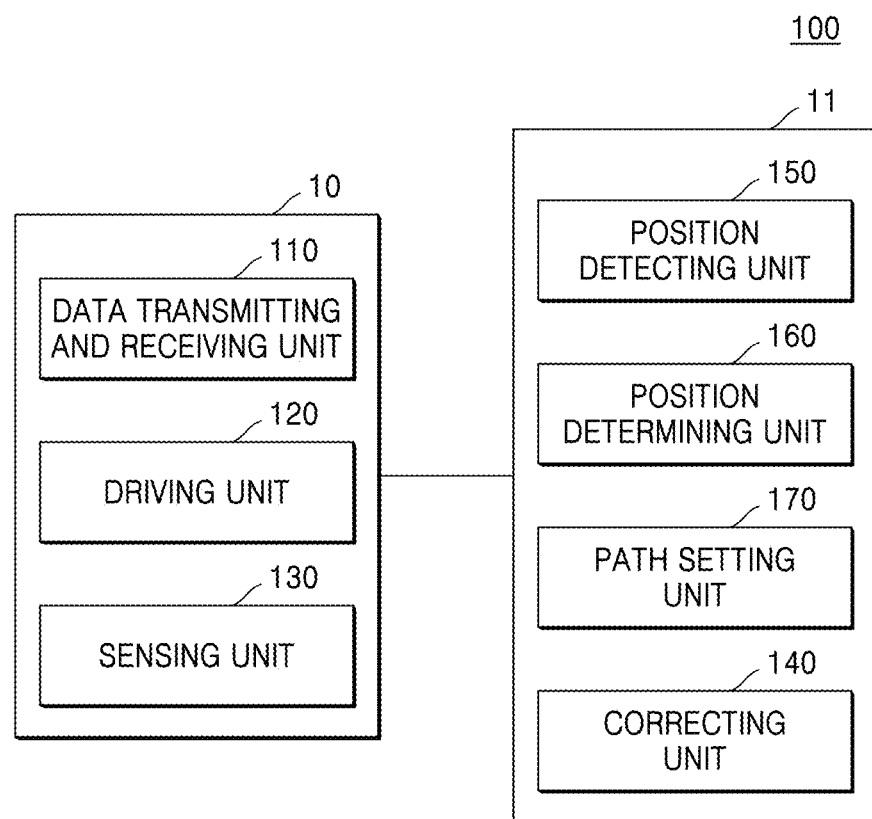
FIG. 2 is a diagram schematically illustrating the configuration of a location measuring system according to another embodiment of the present disclosure.

FIG. 2 illustrates a location measuring system 100 according to another embodiment, in which the computing device 11 may further include a path setting unit 170 from the embodiment illustrated in FIG. 1. Optionally, the path setting unit 170 may also function as a configuration element of the driving-type working device 10.

The path setting unit 170 may set the path in which the driving-type working device 10 moves and sets an initial movement path of the driving-type working device 10 based on the information on the first input target space. In addition, the path setting unit 170 may set the initial movement path in consideration of an amount of data to be sensed by the sensing unit 130 based on the information of the target space. Optionally, the path setting unit 170 may set the initial movement path in consideration of the working path in a case where the driving-type working device 10 operates. In this case, the working path may be set in consideration of the amount of data to be sensed by the sensing unit 130.

The path setting unit 170 may set the path of the driving-type working device 10 and adjust the path of the driving-type working device 10 temporarily and/or continuously based on the first position data generated while moving along the initial movement path as described above. In this case, the position detecting unit 150 may use the space map data in order to set the sensing angle and the sensing position, and simulate the acquisition amount of the sensing data for various sensing angles in consideration of a sensing range of the sensor at the sensing position in order to set the sensing angle at each sensing position.

As described above, the path setting unit 170 sets the path of the driving-type working device 10 throughout the operation process of the driving-type working device 10. Hereinafter, in the present specification, various embodiments of the location measuring system 100 will be described based on the embodiment illustrated in FIG. 2. However, the present disclosure is not necessarily limited to this and it goes without saying that all embodiments of the present specification may be applied to the embodiment illustrated in FIG. 1 as well. In this case, in a case of the embodiment illustrated in FIG. 1 and embodiments based thereon, the path of the driving-type working device 10 may be set in a separate device (not illustrated), or in the position detecting unit 150 and/or in the position determining unit 160.

Figure 3:
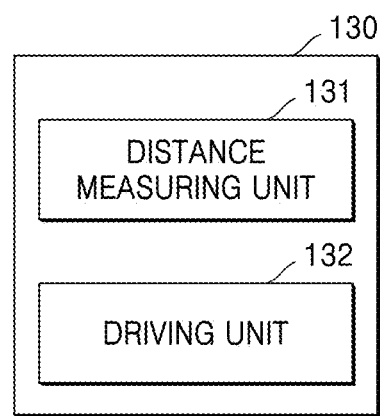
FIG. 3 is a diagram schematically illustrating the embodiment of a correcting unit.

On the other hand, according to another embodiment, as illustrated in FIG. 3, the sensing unit 130 may include a distance measuring unit 131. The distance measuring unit 131 is capable of sensing a distance to a reference point located in the target space. According to an embodiment, a laser sensor may be used, which is capable of measuring the distance to the target by irradiating the target with a laser beam and receiving the reflected light. Optionally, the sensing unit 130 may further include a driving unit 132 which may rotate and/or tilt the distance measuring unit 131. The present disclosure is not necessarily limited to this, the sensing unit 130 does not necessarily require the separate driving unit 132, and only the distance measuring unit 131 may be provided. Optionally, the rotating and/or the tilting the distance measuring unit 131 may be performed by the driving unit 120 of the driving-type working device 10. In addition, rotating and/or tilting the sensors included in the sensing unit 130 may also be performed by a separate self-driving unit and/or a driving unit of the driving-type working device 10.

The reference point may be acquired by a specific object existing in the target space, for example, a specific structure existing on the input drawing data, such as a pole, may be used. In a case of using a pole in the target space, the reference point may be a center point of the pole. In this case, in consideration of the shape and/or dimension of the pole on the drawing data, the distance to the reference point may be calculated by adding the distance from a surface to a center of the pole with the distance to the surface of the pole. Optionally, the reference point may be a point on one surface of the pole. In this case, the distance to the reference point may be the distance to the surface of the pole.

Figure 4:
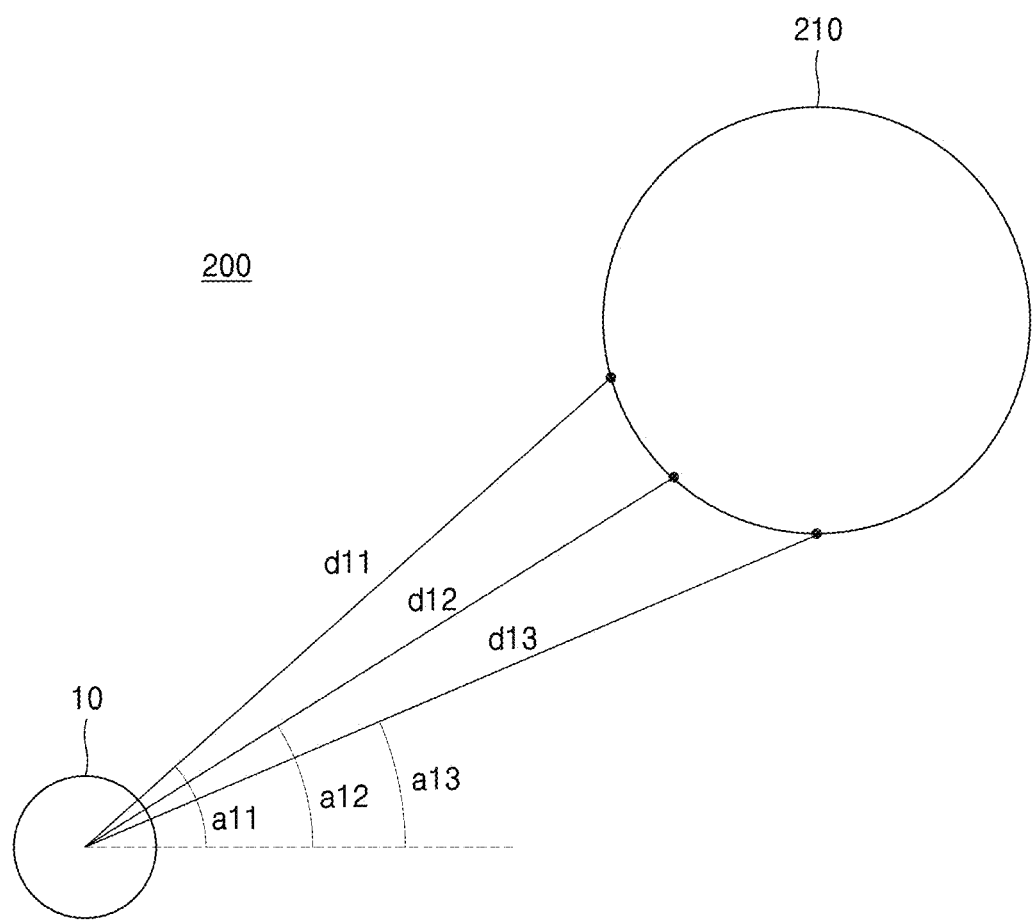
FIG. 4 is a diagram illustrating the embodiment of the correcting unit that is measuring a distance.

As illustrated in FIG. 4, the distance measuring unit of the driving-type working device 10 may measure several locations of the pole 210 at one point in the target space 200 with respect to the pole 210 serving as the reference point. For example, by measuring distances from the driving-type working device 10 to different points of the pole 210, a first distance measurement value d11, a second distance measurement value d12, and a third distance measurement value d13 may be acquired. In this case, the distance measuring unit 131 may be driven by the driving unit 132 to measure various places of the pole 210, and/or the distance measuring unit 131 may further measure angles for different places of the pole 210 in the coordinates at which the driving-type working device 10 is located, so that a first angle measurement value a11, a second angle measurement value a12, and a third angle measurement value a13 may be acquired. In FIG. 4, the angle is based on a specific line, but the present disclosure is not necessarily limited to this, and may be acquired from a relative angle difference between respective points. In addition, the angle may include a beam irradiation angle of the distance measuring unit and/or an angle of a direction toward which the driving-type working device 10 is directed. According to these angle measurements, an optimal point may be found when measuring the distance.

As described above, various places of the pole 210 are measured and the measurement data is transmitted to the correcting unit 140 as the correction data, and the correcting unit 140 may make a statistical model of the measurement data. Such a statistical model may be applied to various models, and an average value of various measurement data may be simply used. In addition, for example, since the shape or type of a pole may be varied, the formula used and the method of measuring the reference point may also be applied in various ways.

In this case, the distance measuring unit 131 may use a number of different measurement values to predict the distance to the center point of the pole 210 even though it does not measure the distance to the center point of the pole 210. This prevents a measurement error that may occur with a single measurement, and an optimal measurement point may be found in the measurement by the distance measuring unit 131. In addition, when the surface of the pole 210 is not even, it is possible to reduce the error by measuring several places and calculating the positions and sizes of the pole as an average value.

Figure 5:
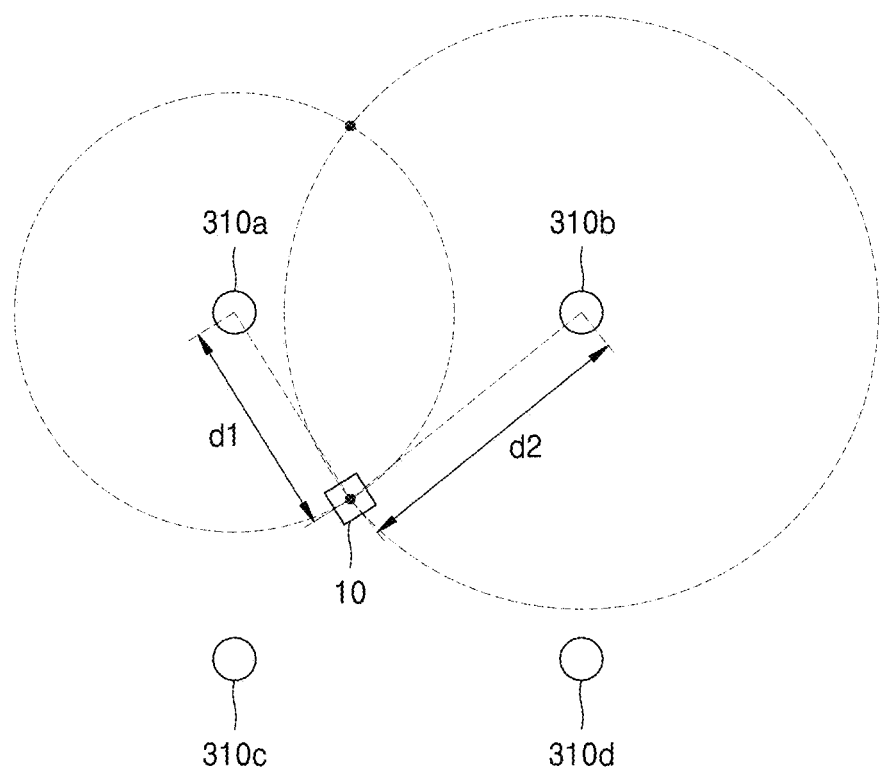
FIG. 5 is a diagram illustrating another embodiment of the correcting unit that is measuring a distance.

Optionally, the distance measuring unit 131 may measure distances from a plurality of reference points at one position, and the correcting unit 140 may use the intersection points to generate correction data. For example, as illustrated in FIG. 5, two points that cross a circle having a radius of a distance d1 from the driving-type working device 10 to the first pole 310a and a circle having a radius of a distance d2 from the driving-type working device 10 to the second pole 310b may be extracted. A point of out of the two points, which is the same and/or near the point measured by the sensing unit 130 and the position detecting unit 150 is the position of the driving-type working device 10. Therefore, the correcting unit 140 may generate the correction data.

The distance measuring unit 131 in the embodiments described above is not limited to acquiring one measurement value at a time, and it may acquire measurement values for a number of points in a single measurement. This may be equally applied to all embodiments of the present specification.

As described above, the correction data generated by the correcting unit 140 is transmitted to the position determining unit 160, and the position determining unit 160 uses the correction data to adjust the first position data, thereby generating the second position data related to the driving-type working device 10.

In a case where the sensing unit 130 includes, for example, the lidar sensor, a large amount of data may be quickly collected because of high speed. Accordingly, in a case of the first position data generated by the position detecting unit 150 based on the data sensed via the sensing unit 130, it is possible to quickly collect an approximate position of the driving-type working device 10. However, as described above, in a case where the distance measuring unit 131 is used, high-accuracy position data may be acquired by generating the correction data and/or the second position data. The position determination based on the correction data by the correcting unit 140 may be selectively performed, so that the position of the driving-type working device 10 may be quickly and/or accurately determined.

Additionally and/or optionally, the path setting unit 170 may set the path of the driving-type working device 10 according to the second position data generated from the position determining unit 160. In this case, the second position data is data corrected by the coordinate values acquired by the above-described correction data with respect to the position coordinates of the driving-type working device 10 in the space map data and/or the sensing map data, Therefore, in a case where the path is set by using the second position data, the accuracy of the path may be further increased. For example, if the error range of the first position data, which is the sensing data, is +/−10 mm, the driving-type working device 10 may once move to the position according to the first position data, and in here, the position may be changed based on the correction data. In a case where the working unit is installed and the error range of the first position data is within a preset range, the working unit may be driven to the position by the second position data corrected based on the correction data to operate at an accurate position, or the device may be driven to operate the working unit in a stationary state. In this case, the set range may be the movable range of the working unit. In a case where the error range of the first position data is out of the set range, the device may be moved to the position corrected by the second position data based on the correction data to perform the operation.

On the other hand, additionally and/or optionally, the correcting unit 140 may track the path of the driving-type working device 10 in the target space and generate the correction data based on the tracked path data.

Figure 6:
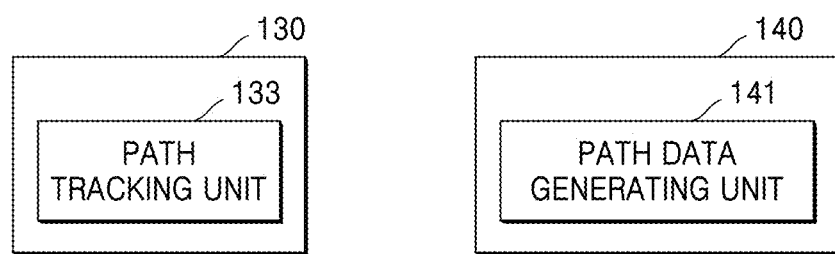
FIG. 6 is a diagram schematically illustrating another embodiment of the correcting unit.

For example, FIG. 6 illustrates the sensing unit 130 and correcting unit 140 according to another embodiment, in which the sensing unit 130 may include a path tracking unit 133 and the correcting unit 140 may include a path data generating unit 141.

The path tracking unit 133 may sense a place such as a floor surface or a wall surface (hereinafter, referred to as a floor surface or the like) while the driving-type working device 10 moves. The sensing data may be generated as movement path data by the path data generating unit 141. The path tracking unit 133 may include a camera and/or an image sensor capable of capturing an image. The path tracking unit 133 may sense a visual element or other features of the sensing surface, for example, a texture or a pattern thereof. The path tracking unit 133 may use the image sensor and/or the camera module included in the sensing unit 130.

The images continuously and/or discontinuously captured by the path tracking unit 133 may be processed as path data. The path data becomes a movement path map on which the driving-type working device 10 moves or may include the movement path map.

The above-mentioned correction data becomes data including such a movement path map, and the movement path map may correspond to the working path on which the driving-type working device 10 will work later. The position determining unit 160 may generate the second position data obtained by combining the above-described first position data with the correction data. In addition, the path setting unit 170 may set a path based on the second position data. According to an embodiment, in this case, the path based on the second position data may mean a path on which an item of the above-described correction data is added and stored to the path set based on the first position data.

Later, even when the driving-type working device 10 is working, the path tracking unit 133 may track the movement path to sense the same path, and the path data generating unit 141 may generate the path data therefrom. The path setting unit 170 may compare the path data generated at work with the data created before to work in a correct orientation and position.

The path data generating unit 141 may use an encoder with respect to the captured image to combine the path data with time data and/or distance data.

According to another embodiment, when the path data generated by of the driving-type working device 10 at work is compared with the path data created before, for example, in a case where the work is performed on the same position, the path setting unit 170 may use the path data created before as it is, thereby reducing the time for generating the path data. However, in a case where the path data which is newly created is different from the path data created before by more than a certain degree, an error may occur. Therefore, the path data may be newly generated for specific time and/or distance, and compared with the path data created before.

According to another embodiment, such path data may be included in the first position data. That is, the path data may be generated simultaneously when the driving-type working device 10 senses the target space, and the path data may be included in the first position data.

Figure 7:
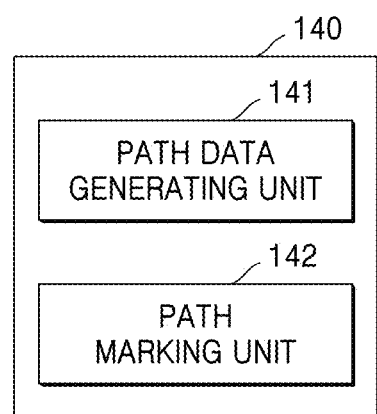
FIG. 7 is a diagram schematically further illustrating another embodiment of the correcting unit.

FIG. 7 illustrates the correcting unit 140 according to another embodiment, in which the correcting unit 140 may further include a path marking unit 142 by adding the path data generating unit 141 which is described above.

When the movement path is tracked by the path tracking unit 133, in a case where there is no specific pattern or texture on the floor surface or in a case where it is difficult to sense the features of the floor surface, the specific pattern of the floor surface or the like may be marked by the path marking unit 142. This marking may be carried out if it is required by the driving-type working device 10. That is, the marking may be performed when the driving-type working device 10 moves and/or stops to generate the first position data and/or the second position data. Such a pattern may be marked at a specific point of the movement path, and according to an embodiment, when the marking is performed at multiple points, the pattern may be equally generated. However, the present disclosure is not limited to this; multiple points may be classified by group, and a different pattern may appear for each group. Optionally, multiple points may be different patterns.

Such a pattern may be provided in a visually determinable form, but the present disclosure is not limited to this, and it may be formed not visible to the eyes of the worker. However, the pattern must be recognized by the path tracking unit 133. For example, the pattern may be formed of a photosensitive agent. In this case, the path tracking unit 133 may detect features with a black light or special equipment capable of recognizing the photosensitive agent. Such a pattern is not necessarily formed continuously, may be formed discontinuously, or may be formed with a regular or irregular interval. Alternatively, it may be formed only at a specific position.

As described above, the embodiments of the sensing unit 130 and/or the correcting unit 140, that is, the embodiments illustrated in FIGS. 3, 6 and 7 may be applied in combination with each other.

Figure 8:
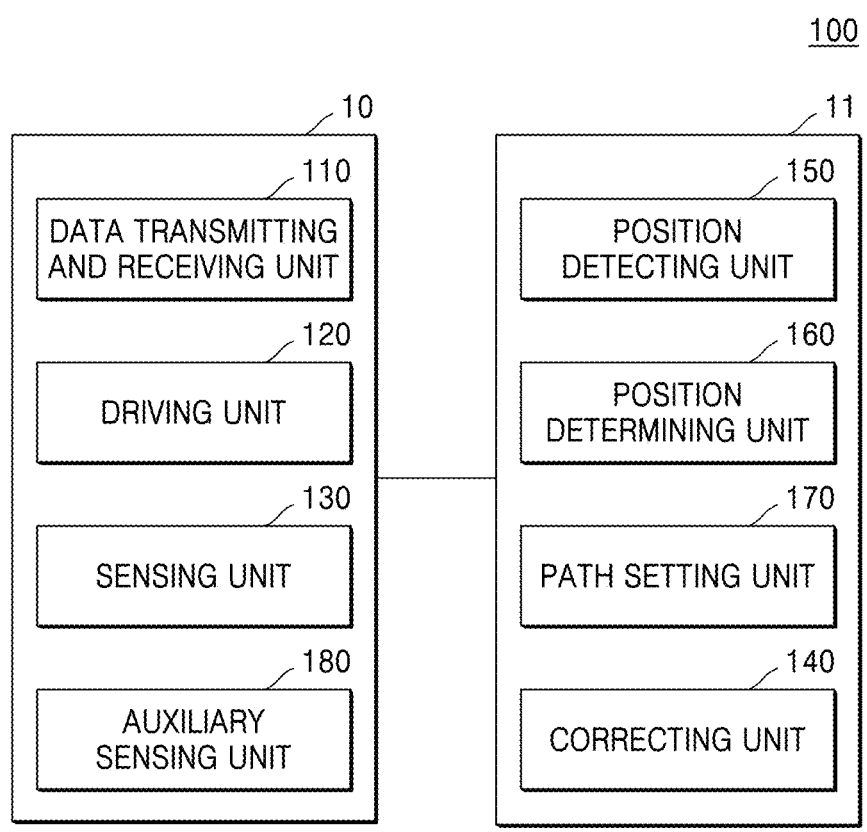
FIG. 8 is a diagram schematically illustrating another embodiment of a location measuring system of the present disclosure.

FIG. 8 illustrates a location measuring system 100 according to another implementation.

In a case of the embodiment illustrated in FIG. 8, an auxiliary sensing unit 180 may be further included in addition to the embodiment illustrated in FIG. 2.

Figure 9:
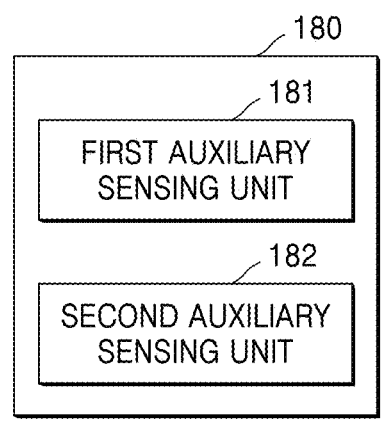
FIG. 9 is a diagram schematically illustrating an embodiment of an auxiliary sensing unit.

According to an embodiment, as illustrated in FIG. 9, the auxiliary sensing unit may include a first auxiliary sensing unit 181 and a second auxiliary sensing unit 182.

The first auxiliary sensing unit 181 may sense other sensible objects apart from the object sensed by the sensing unit 130. Specifically, the first auxiliary sensing unit 181 may be an ultrasonic sensor and sense an object having a material which is not sensed or hard to be sensed by the sensing unit 130. For example, in a case where the sensing unit 130 includes the laser sensor has difficulty sensing transparent materials such as glass, transparent plastic, or the like. In this case, sensing is performed by the first auxiliary sensing unit 181 which is an ultrasonic sensor. In addition, in a case where there is a hole on the floor surface of the target space, the driving-type working device 10 may fall therein. Detecting such hole on the floor can prevent the driving-type working device 10 from falling into such hole.

The second auxiliary sensing unit 182 may sense a degree of tilting in a direction forming an inclination with the moving direction of the driving-type working device 10. More specifically, the second auxiliary sensing unit 182 may sense the degree of inclination of the body of the driving-type working device 10. Although not illustrated in the drawing, the driving-type working device 10 may include a separate driving unit for returning the body of the driving-type working device 10 to a stable position by compensating the degree of the tilting sensed by the second auxiliary sensing unit 182.

In a case of the embodiment illustrated in FIG. 9, the auxiliary sensing unit 180 includes both the first auxiliary sensing unit 181 and the second auxiliary sensing unit 182, but the present disclosure is not limited to this, and the auxiliary sensing unit 180 may include at least one of the first auxiliary sensing unit 181 or the second auxiliary sensing unit 182.

Figure 10:
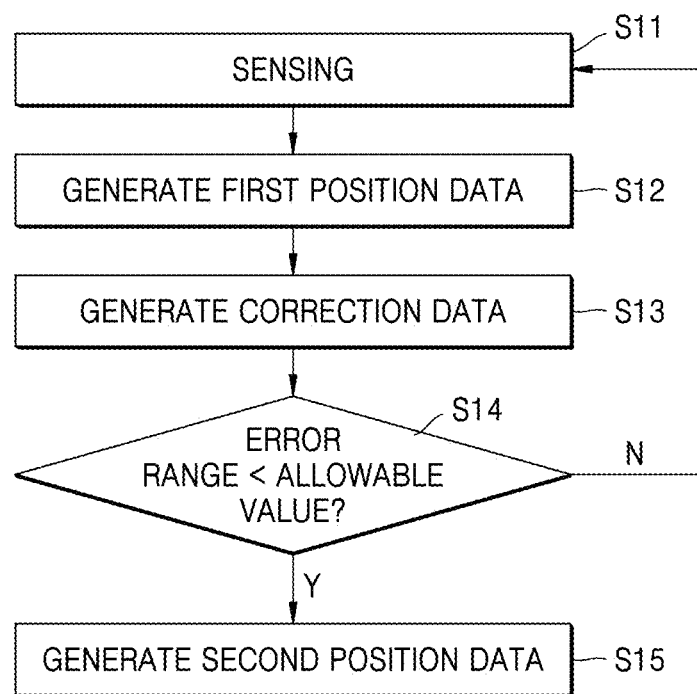
FIG. 10 is a flowchart schematically illustrating the flow of a location measuring method of the location measuring system according to embodiments of the present disclosure.

FIG. 10 is a flowchart according to an embodiment schematically illustrating the flow of a location measuring method of the location measuring system 100 of the embodiments described above. The flowchart described below may be applied to the location measuring system 100 of all embodiments described in the present specification.

Referring to FIG. 10, the location measuring method of the driving-type working device according to an embodiment of the present disclosure may include a sensing step S11, a generating step of the first position data S12, a generating step of the correction data S13, a comparing step of the error range with an allowable value S14, and a generating step of the second position data S15.

The driving-type working device performs the sensing for the target space S11. The sensing processed in the sensing step S11 is not limited to one time, the space map data may be generated with the sensing data by primarily sensing by the driving-type working device, and the current position of the driving-type working device may be determined based on the space map data while performing secondary sensing. Before and after the sensing, the driving-type working device may receive information on the target space. (a) of FIG. 11 may be the drawing data 400 input via the data transmitting and receiving unit 110. As illustrated in (a) of FIG. 11, in the drawing data which is the initial map data, a first pole 310a to a fourth pole 310d are disposed in the target space 300. Although not illustrated in the drawing, the drawing data 400 may include work information such as lines forming the walls in addition to the poles.

Next, in the embodiments described above, the position detecting unit 150 generates the first position data S12. The first position data may include the space map data formed by the sensing. Additionally and/or optionally, the position detecting unit 150 may compare the space map data with the sensing data to generate first position data. The sensing data may be various data sensed by the sensing unit of the driving-type working device at a specific time point.

Figure 11:
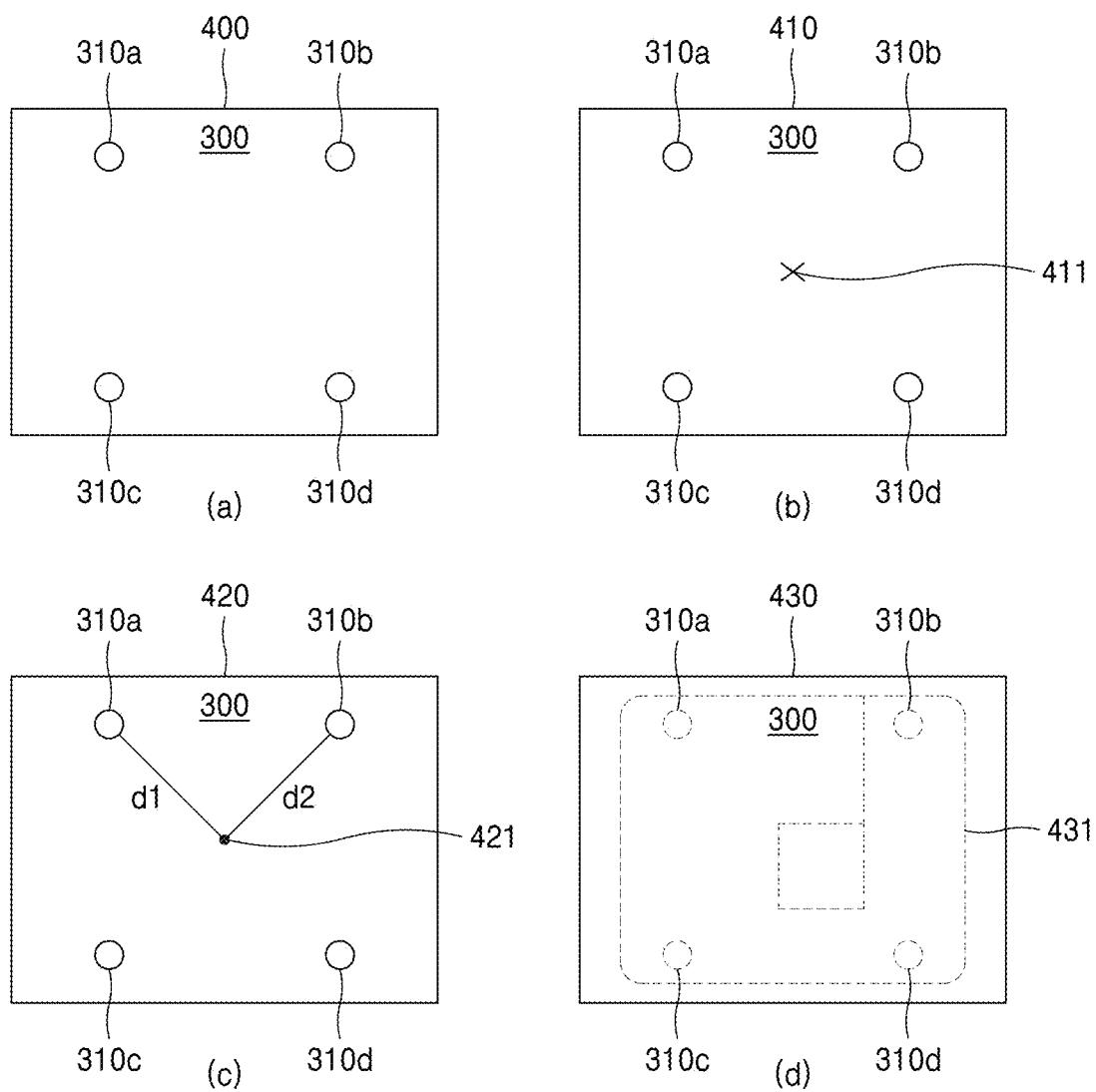
FIG. 11 are diagrams illustrating data about a target space in each steps of FIG. 10.

(b) of FIG. 11 may be a first position data 410 which may include the space map data, the target space 300, and appear as the sensed map data obtained by sensing that the first pole 310a to the fourth pole 310d are disposed in the target space 300. The first position 411 of the driving-type working device may appear in the sensed space map data obtained by the sensing. The space map data 410 as described above may be compared with the input drawing data 400 to grasp whether a feature point such as the pole is in the real space.

Thereafter, by using the additional sensing data by the sensor of the sensing unit 130, the correction data is generated by the correcting unit 140 S13.

Next, by comparing the first position data and the correction data, if the error range is within an acceptable value, the second position data is generated S15. According to an embodiment, the generation of the second position data may be performed by the position determining unit 160 which is described above. The second position data may be obtained by correcting the first position data by using the correction data. As a result of comparing the first position data with the correction data, if the error range is larger than the allowable value, the sensing may be performed again S11.

According to an embodiment, as illustrated in (c) of FIG. 11, a second position 421 of the driving-type working device may be generated by using the correction data generated in the space map data based on a first distance d1 to the first pole 310a and a second distance d2 to the second pole 310b.

Additionally, and/or optionally, the second correction data may be formed by using the second correction data 430 as illustrated in (d) of FIG. 11. The second correction data 430 may include the movement path 431 which tracks a travel path of the driving-type working device. In this case, the first position data may include the path data generated during the previous sensing. Therefore, the movement path 431 may be compared with the path data included in the first position data. In a case where the movement path 431 is same as the path data included in the first position data, the position data including the path data may be the second position data S17. In a case where the movement path 431 is not same as the path data included in first position data, the path data is generated while performing the sensing operation again, and the path data is compared with the previous path data and/or the reference path data to grasp the accuracy of the current position.

As described above, by determining the second position data, the location measuring system grasps the accurate position of the driving-type working device, and the information on the target space may be recognized.

Figure 12:
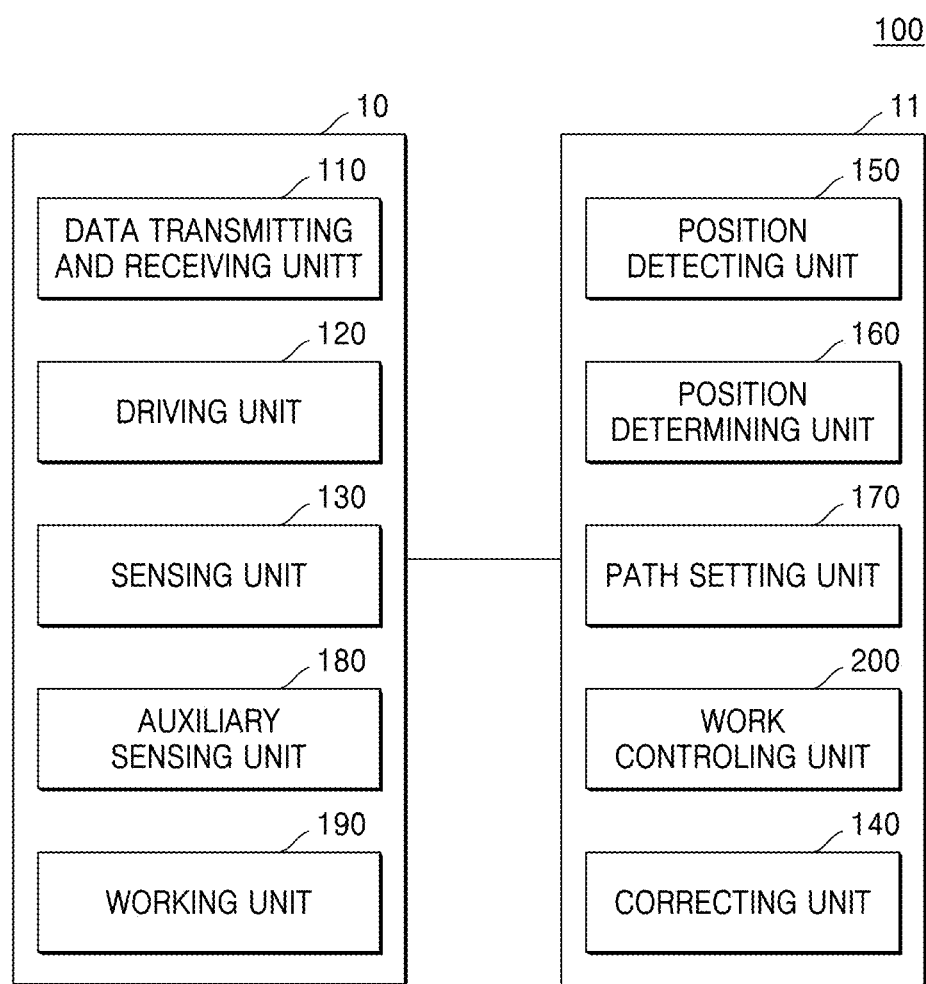
FIG. 12 is another diagram schematically illustrating the configuration of a location measuring system according an embodiment of the present disclosure.

FIG. 12 illustrates the location measuring system 100 according to still another embodiment.

The location measuring system 100 according to the embodiment illustrated in FIG. 12 may further include a working unit 190 and a work controlling unit 200 in addition to the embodiment illustrated in FIG. 8.

The working unit 190 performs work in response to the work data received via the data transmitting and receiving unit 110. Specifically, in response to the work data, work such as marking, drilling, welding, cutting, screwing, fastening, tightening, locking, or punching may be performed. The marking includes all of displaying the work data by using a pigment on the working surface, leaving a scratch on the working surface, partially etching the working surface with a laser, and displaying data on the working surface of a line machine or the like. Accordingly, the working unit 190 may further include various working modules such as a marking unit, a drill, a welding unit, a cutting unit, a screwing unit, a locking unit, a fastening unit, a tightening unit, a fastening unit, and a punching unit so as to perform marking, drilling, welding, cutting, screwing, tightening, bundling, fastening, and punching. The working unit 190 may include a mowing unit to display the work data by mowing the grass when the grass is planted on the floor surface. The working unit 190 may include a plate unit to display a three-dimensional shape by pushing sand or blocks. The working unit 190 may include a 3D printing unit to print a three-dimensional shape. The working unit 190 may include an arm unit capable of stacking objects such as blocks in a three-dimensional shape. The working unit 190 may be provided to perform the installation of a specific device on the wall, a pole, a floor, or a ceiling. For example, the working unit 190 may perform work for installing an outlet on a wall, a pole, a floor, or a ceiling.

It goes without saying that various embodiments of the working unit 190 may be applied to all embodiments of the present specification.

Optionally, the work data may include a symbol which the working unit 190 may recognize. For example, the symbol may include a line, a figure, or other geometric shape. Alternatively, the symbol may be displayed by a barcode, a QR code, a number, or a letter.

Optionally, the work data may be displayed with a special photosensitive agent that may be recognized by the working unit 190. For example, the photosensitive agent may not be recognized by the naked eye but may be recognized by the working unit 190. To this end, the working unit 190 may further include a sensing unit capable of recognizing a special photosensitive agent.

Figure 13:
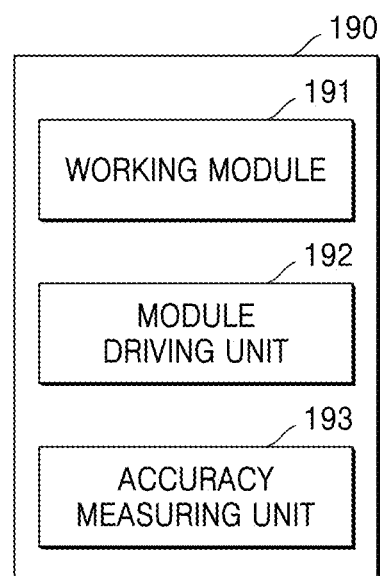
FIG. 13 is a diagram schematically illustrating an embodiment of a working unit.

According to a specific embodiment, as illustrated in FIG. 13, the working unit 190 may include a working module 191, a module driving unit 192, and an accuracy measuring unit 193.

The working module 191 may be provided to move freely, including up and down, left and right, in order to perform work corresponding to the work data included in the information corresponding to the target space, which is received by the data transmitting and receiving unit 110. The working module 191 may perform an operation of making a certain mark at a specific position or drawing a line on the movement path on the working surface in response to the work data. Additionally and/or optionally, when rotation values are detected by other sensors included in the sensing unit 130, for example, the gyro sensor, it is possible to increase the accuracy of the work by performing the work while receiving the value.

The module driving unit 192 may be provided such that the working module 191 may move up and down, left and right within a predetermined range. Optionally, according to another embodiment, the module driving unit 192 is not necessarily provided and the working module 191 may be fixedly installed on the body of the driving-type working device 10.

According to an embodiment of the present disclosure, the accuracy measuring unit 193 may be further provided, and the accuracy measuring unit 193 may specifically include an image sensor and/or a camera module.

According to an embodiment, the accuracy measuring unit 193 may include a pair of camera modules. Such camera modules may be installed behind the front of the driving-type working device 10, and measure a marking output, that is, a curve of a line or a degree of conversion thereof to measure the accuracy of the output. The accuracy measuring unit 193 is not necessarily included in the working unit 190 and the image sensor and/or the camera module of the sensing unit 130 and/or the auxiliary sensing unit 180 may be used.

The accuracy of the output measured by the accuracy measuring unit 193 is transmitted to the work controlling unit 200.

The work controlling unit 200 may control the work and/or operation of the working unit 190. The work controlling unit 200 may receive the path information set by the path setting unit 170, and then instruct the work in an area in which the work has to be performed by the work information of each path.

And/or, the work controlling unit 200, which receives a sensing value from at least one sensor of the sensing unit 130, may transmit a more accurate work instruction to the working unit 190 based thereon. The accuracy measuring unit 193 may sense the work output to feed back to the working control unit.

The work controlling unit 200 may command work adjustment in light of the accuracy information transmitted from the accuracy measuring unit 193. The accuracy information may also be transmitted to the path setting unit 170. The path setting unit 170 may adjust the movement path of the driving-type working device 10 in view of the accuracy information.

The working unit 190 does not necessarily perform the work only on the floor surface of the target space and may perform the work on various areas such as the wall surface and the ceiling surface of the target space.

Figure 14:
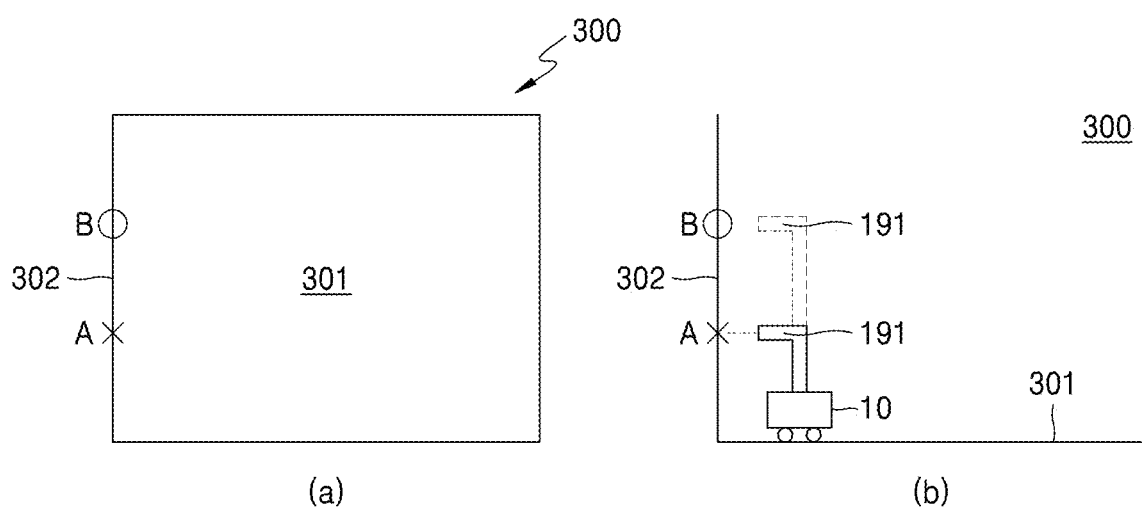
FIG. 14 is a diagram for explaining an embodiment of working on a wall surface of a target space.

FIG. 14 is a diagram for explaining an embodiment for working on the wall surface of the target space.

As illustrated in FIG. 14, in a case where there are contents of A and B to be worked at different positions in height on the wall surface 302 of the target space 300, plane positions and height data of A and B have to be included in the information of the target space in advance. As illustrated in (b) of FIG. 14, the marking module 191 of the driving-type working device 10 may be moved to the plane positions of A and B based on the information of the target space, and then the marking module 191 may be driven by a set height to perform the work of A and B.

Figure 15:
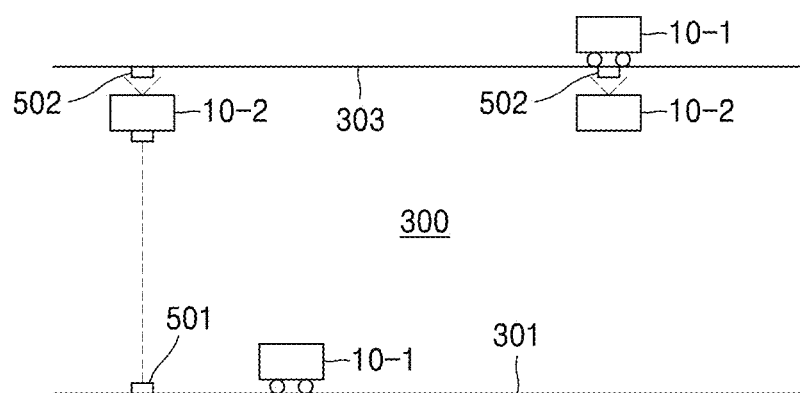
FIG. 15 is a diagram for explaining an embodiment of working on a ceiling surface of the target space.

FIG. 15 is a diagram for explaining an embodiment of working on the ceiling surface of the target space.

In an embodiment, the first driving-type working device 10-1 is located on the floor surface 301 of the target space 300 and a second driving-type working device 10-2 is located so as to be opposed to the ceiling surface 303. The second driving-type working device 10-2 may be provided in a form capable of flying, but the present disclosure is not necessarily limited to this, and although not illustrated in the drawing, it may be a device that moves along a rail disposed on the ceiling surface 303.

In this case, the first driving-type working device 10-1 may first perform a draft work 501 on the floor surface 301 for the content to be worked on the ceiling surface 303, and the second driving-type working device 10-2 may sense the draft work 501 performed on the floor surface 301 to perform the ceiling work 502 directly above the draft work 501. According to an embodiment, the second driving-type working device 10-2 may not include a separate position recognition device but may include means for recognizing only the draft work 501. However, the present disclosure is not necessarily limited to this and the second driving-type working device 10-2 may be provided to recognize a position by the above-described location measuring system in the same manner as the first driving-type working device 10-1.

In another embodiment, the first driving-type working device 10-1 may be located on one side of the ceiling surface 303 and the second driving-type working device 10-2 may be located on the other side of the ceiling surface 303. The first driving-type working device 10-1 may be located on the upper surface of the ceiling surface 303 and the second driving-type working device 10-2 may be located on the lower surface of the ceiling surface 303.

In this case, when the first driving-type working device 10-1 recognizes the position using the above-described location measuring system to move to the working position, and gives a signal to the second driving-type working device 10-2, the second driving-type operation device 10-2 may receive the signal to move to the position where the first driving-type working device 10-1 is located to perform the ceiling work 502. Therefore, the second driving-type working device 10-2 may not include a separate location recognizing device, but include only means for recognizing the signal transmitted from the first driving-type working device 10-1. However, the present disclosure is not necessarily limited to this and the second driving-type working device 10-2 may be provided to recognize a position by the above-described location measuring system in the same manner as the first driving-type working device 10-1.

As described above, if the ceiling work is performed by a pair of the first driving-type working device 10-1 and the second driving-type working device 10-2, the device which performs the ceiling work may be dependent on the device which is located on the floor surface, and because a other additional position measurement does not need to be precisely performed, the ceiling work may be performed simply and accurately.

Figure 16:
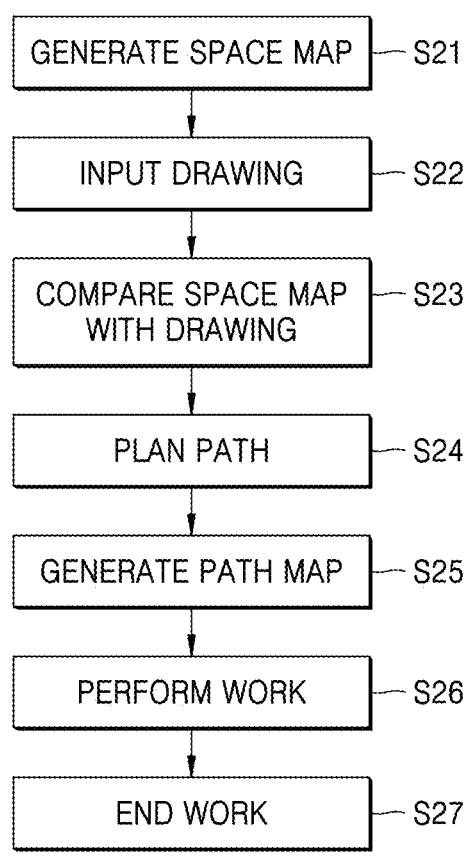
FIG. 16 illustrates a working method of a location measuring system according to an embodiment.

FIG. 16 illustrates a working method of the location measuring system according to an embodiment and illustrates a working method by the location measuring system illustrated in FIG. 12.

First, the position detecting unit 150 may generate a space map of the target space with the moving and/or stopping of the driving-type working device 10 (S21).

As described above, the space map may use the data formed by sensing the space of the sensing unit 130. According to an embodiment, it may be acquired through sensing the space by using the lidar sensor.

Since orientation data may be received from the gyro sensor of the sensing unit 130 when the space map is generated, the space map may be generated more quickly. In addition, error from the map generation may be reduced by using the encoder of the sensing unit 130. In addition, the space map sensed by the lidar may be corrected by calculating the velocity and attitude angle of the driving-type working device 10 by using the acceleration and angular velocity data acquired from the IMU sensor of the sensing unit 130.

When searching for the space, the driving-type working device 10 moves in a straight line until it meets an obstacle, when it meets the obstacle, the orientation thereof is changed randomly, and the search may be performed in such a manner as to repeat the process. Then, when areas that have not yet been explored are identified, the space may be explored by the driving-type working device 10 which moves and finds these areas one by one.

Additionally and/or optionally, the position detecting unit 150 may divide the target space into grids of specific areas to create the space map. According to an embodiment, the space map data may be created as an occupancy grid map. In this case, the position detecting unit 150 may estimate a possibly that each grid in the space is filled with an obstacle. The position detecting unit 150 may select a grid with high uncertainty with respect to the content thereof in the occupancy grid map, and may select a grid adjacent to an empty grid of the grid list. The driving-type working device 10 may be moved by selecting, as a target, the closest grid with high uncertainty from the grid list. For example, in a space of 1,200 $m^2$, the position detecting unit 150 may start the detection with an uncertainty of about 5,000 to 7,000 grids. If enough data has been collected or it is determined that the point cannot be reached, the point may be deleted from the grid list. In addition, if it is determined that the point cannot be reached, other nearby points in the space are also considered unreachable and may be deleted from the grid list. When the list of uncertain grid is minimized, for example, when the list of uncertain grid is 0, it may be considered that the exploration for the target space is completed.

After the space map generation is completed and/or before completed, the drawing may be input via the data transmitting and receiving unit 110 S22. Such drawing data may include the work data performed by the driving-type working device 10, for example, the drawing data to be drawn on the working surface and the information to be used as the reference point such as the pole present in the space.

Next, the space map and the drawing are compared with each other S23. The comparison of the drawing data and the space map data enables the driving-type working device 10 to search for a specific position defined in the drawing. The drawing data and the space map data may be aligned with each other by searching for correspondences of features such as the corners or the poles. When the drawing data and the space map data are aligned with each other, the position detecting unit 150 may use the space map data and the sensing data (for example, the lidar reading value) to estimate the current position of the driving-type working device 10 based on the drawing data. If the automatic alignment between the space map and the drawing fails, the space map and the drawing may be aligned with a manual function.

The path setting unit 170 may plan a movement path on which the driving-type working device 10 will perform the work S24. The planning of the path may use various methods of the above-described embodiments. When planning the path, for example, the line to be drawn and the reference pole which is used as the reference may be selected. The pole, which is located at a position near the lines to be drawn or has a constant angle, may be selected first. A goal of the path planning is to perform the work as much as possible per path. For example, when drawing the two parallel lines, if a width thereof is narrower than a maximum value that may be drawn by the driving-type working device 10, it may be planned to draw the two lines at a time, or an optimal path may be to calculate. Such path planning may be performed after determining a start point as described later.

Figure 17:
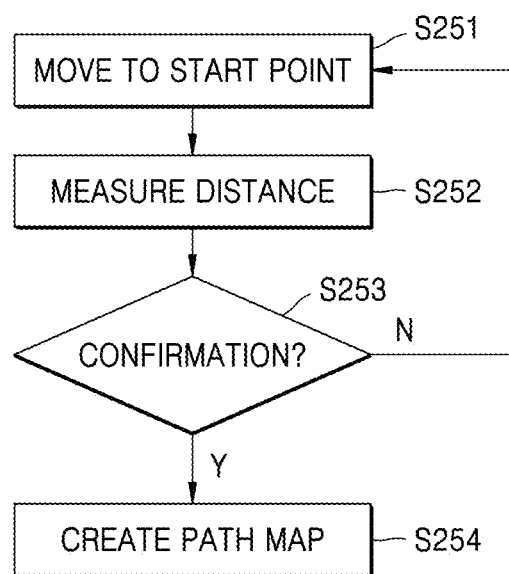
FIG. 17 illustrates an embodiment of generating a path map.

Next, the location measuring system generates a path map associated with the path on which the driving-type working device 10 performs the work and/or the path on which the driving-type working device 10 moves S25. FIG. 17 illustrates an embodiment in which the path map is generated. First, the driving-type working device 10 is moved to the start point of the path S251. The lidar sensor may be used when the driving-type working device 10 is moved to the start point.

At the start point, the driving-type working device 10 may use the distance measuring unit 131 of the sensing unit 130 to measure the distance with respect to various types of structures and/or objects, for example, the reference points such as the poles S252. The reference point for distance measurement may be automatically specified by the path setting unit 170 in view of the path described above, but the present disclosure is not limited to this, and the reference point may be selected by the user.

For example, the distance measuring unit 131 may measure the distance between a pair of poles and the driving-type working device 10, use the data to predict/measure the positions and diameters of the poles, and transmit the data to the position determining unit 160. The distance measurement may be performed, for example, by using the method illustrated in FIG. 5.

As described above, by measuring the distance by using the distance measuring unit 131, the position determining unit 160 confirms the start point and confirms whether the start point is located within an error range S253. In a case where it is not the start point or the start point is out of the error range, the driving-type working device 10 moves to find the start point again using the lidar sensor S251, and performs the work for measuring the distance S252. In addition, after the start point is confirmed, the correcting unit 140 uses the sensing unit 130 to create the path map S254.

The driving-type working device 10 may generate the path data via the path tracking unit 133 and the path data generating unit 141 while moving along the path, and create a path map therefrom over the whole path. At an end of the path, the driving-type working device 10 uses the distance measuring unit 131 to measure the distance to the pole which is the reference point, thereby confirming a position of the end point. This process of measuring the distance is not necessarily to be carried out only at the start point and the end point, the measurement may be performed several times during the driving-type working device 10 travels on the path. When the distance measuring unit 131 and the pole are far away, since it is not easy for the distance measuring unit 131 to aim at the center of the pole, a statistical model is made by measuring several places of the pole, and the distance to the center point may be estimated by using other measurement values, even if the distance measuring unit 131 does not directly measure the center point of the pole. In addition, since the surface of the pole may be uneven, by measuring several places, errors of the position and size of the pole may be reduced by using an optimal value by an average value and/or a mathematical model. When the reference point is specified from a number of kinds of the structures and forms for the distance measurement, the measurement and/or prediction method may be variously applied according to the features of each structure and form.

The driving-type working device may perform the process for several divided work paths described above.

The driving-type working device 10 may find features of the collected path data, such as features of images of the path floor. A mathematical model may be created for the relative positions of the collected floor images. Data from the gyro sensor and/or encoder may also be used at this time to further increase accuracy.

For each element of the path to be processed during the working process, a relative offset between absolute positions measured by the distance measuring unit 131 at the start point and the end point, and floor images that is continuously captured may be combined to estimate the absolute position of each image in the floor coordinate system of the path map. When the calculation is completed, the work is now ready and is performed S26.

Figure 18:
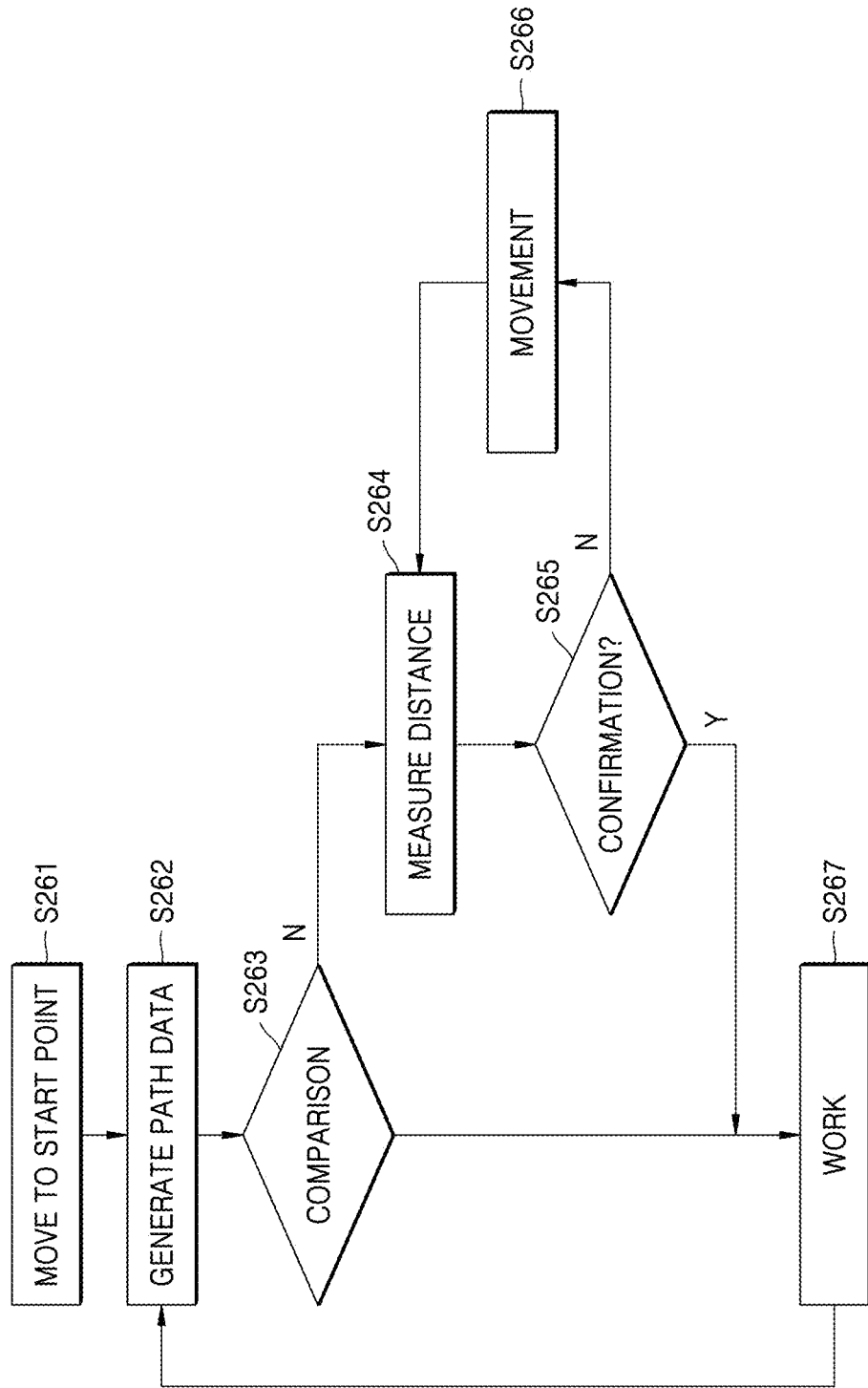
FIG. 18 illustrates a more specific embodiment of performing work.

FIG. 18 illustrates a further specific embodiment for performing the work. First, the driving-type working device 10 may use the lidar sensor to move to the start point S261.

Here, the path data is generated again S262. The path data may be the captured floor image.

Thereafter, the newly generated path data is compared with the previously generated path data S263 to determine the accurate position and then the work is started S267.

As described above, as a result of confirming the position of the start point, in a case where there is an error and the error is out of the allowable range, the distance to the pole which is the reference point is measured S264 and the start point is confirmed whether being within an error range S265. In a case of not-the-start point or the start point is out of the error range, the driving-type working device 10 is moved to find the start point again with the lidar sensor S266, and performs the work for measuring the distance S264. In addition, after the start point is confirmed, the work is started S267. This distance measuring method may be used multiple times at any time when accuracy and error confirmation is required while traveling on the path.

Even during the work is performed, the path data may be continuously and/or discontinuously generated S262. Whenever the driving-type working device 10 generates the path data, the current position is referred by comparing with previously acquired path data S263. In this case, the current position may be confirmed by combining the position calculated by using the path data with a dead reckoning method.

During generating the initial path data and/or during traveling on the path for work, the time and/or distance data may be respectively recorded in the path data. That is, it is possible to include the time data and distance data as required when creating the initial path data, and the time and/or distance data may be recorded as required in the path data generated during the work thereafter. Accordingly, even during the work is performed, an accurate position may be estimated by first comparing time and/or distance data of previous path data. In a case where the path data includes an image of the path, since the time and/or distance data may be compared faster than a comparison time of the image or distance data, the comparison of the path data may be achieved with a faster time.

The path data described above may use an encoder.

In addition, in the driving-type working device 10, the rotation of the driving-type working device 10 may be measured by the gyro sensor while traveling on the path. In this case, the direction error may be estimated by continuously comparing a value calculated by the gyro sensor with a value estimated by the SLAM. While the SLAM is more effective for determining the absolute orientation, the gyro sensor is more effective for measuring a change over a small period of time. While the driving-type working device 10 is moving, the position determining unit 160 continuously monitors the data of the gyro sensor to predict a future turning direction of the driving-type working device 10, and the work controlling unit 200 may compensate for the rotation of the driving-type working device 10 to determine the rotation direction and degree of the working module 191.

Even while the work is in progress, it is possible to further increase the accuracy of the work by using the above-described auxiliary sensing unit 180.

As this manner is repeatedly applied, the driving-type working device 10 performs the work and ends the work at the end point of the work S27.

Of course, all embodiments described in the present specification may be applied in combination with each other.

On the other hand, the present disclosure may be implemented as a computer-readable code on a computer-readable recording medium. The computer-readable recording medium includes any type of recording device in which data readable by a computer system is stored. Examples of computer-readable recording media include ROM, RAM, CD-ROM, magnetic tape, floppy disk, optical data storage device, and the like.

In addition, the computer-readable recording medium may be distributed over network coupled computer systems, so that the computer-readable code is stored and executed in a distributed fashion. In addition, functional programs, codes, and code segments for implementing the present disclosure may be easily inferred by programmers in the technical field to which the present disclosure pertains.

The steps constituting the method according to the present disclosure may be performed in an appropriate order, unless explicitly stated or contrary to the order. The present disclosure is not necessarily limited to the order in which the steps are described.

The use of all examples or exemplary terms (for example, and the like) in the present disclosure is merely for the purpose of describing the present disclosure in detail, and the scope of the present disclosure is not limited by the examples or exemplary terms unless limited by the claims. In addition, a person skilled in the art may appreciate that various modifications, combinations and changes may be made according to design conditions and factors within the scope of the appended claims or their equivalents.

Therefore, the spirit of the present disclosure should not be limited to the above-described embodiments, and not only the claims described below, but also all scopes equivalent to or changed from the claims belong to the category of the spirit of the present disclosure.

What is claimed is:

1. A location measuring system including a driving-type working device, the location measuring system comprising:
   a data transmitter and receiver configured to transmit or receive information on a target space in which the driving-type working device is located;
   a driver configured to provide power to the driving-type working device;
   a sensor configured to sense the target space;
   a position detector configured to detect a position of the driving-type working device to generate first position data;
   a correcting processor configured to correct a position of at least a portion of the driving-type working device to generate correction data about the position of the driving-type working device; and
   a position determining processor configured to generate second position data of the driving-type working device from the first position data and the correction data, wherein the sensor comprises at least one distance sensor configured to measure a distance to a first reference point in the target space by using a laser beam, wherein the distance sensor is configured to:
   measure a first distance to between the distance sensor and a first portion of the first reference point in the target space at one location by irradiating a first laser beam to the first portion and receiving a first reflected beam of the first laser beam from the first portion,
   measure a first angle between the first laser beam and a first reference line extending from the distance sensor,
   measure a second distance between the distance sensor and a second portion of the first reference point in the target space by irradiating a second laser beam to the second portion and receiving a second reflected beam of the second laser beam from the second portion, and
   measure a second angle between the second laser beam and the first reference line,
   wherein the distance sensor is comprises a laser sensor configured to irradiate both the first laser beam and the second laser beam respectively to the first and second portions of the first reference point, and
   wherein the position determining processor is configured to determine the position of the driving-type working device based on the first distance and the second distance.

2. The location measuring system of claim 1, wherein the correcting processor is configured to generate the correction data based on movement path data representing a movement path of the driving-type working device.

3. The location measuring system of claim 2, wherein the correcting processor is configured to generate a pattern by which a movement path of the driving-type working device is able to be tracked in the target space.

4. The location measuring system of claim 1, further comprising:
   a path setting processor configured to set a movement path of the driving-type working device according to at least one of the first position data or the second position data.

5. The location measuring system of claim 1, wherein the position detector is configured to compare map data about the target space received by the data transmitter and receiver with data about the target space sensed by the sensor to generate the first position data.

6. The location measuring system of claim 1, wherein the driving-type working device further includes at least one of a first auxiliary sensor configured to sense a sensed body different from a sensed body sensed by the sensor or a second auxiliary sensor configured to sense a tilting degree of a direction forming a tilt with an advancing direction of the driving-type working device.

7. The location measuring system of claim 1, wherein the driving-type working device further includes an accuracy measuring processor configured to measure the accuracy of work performed on a working surface in the target space.

8. The location measuring system of claim 1, wherein the driving-type working device includes:
   a first driving-type working device configured to work on a first surface in the target space; and
   a second driving-type working device configured to work on a second surface opposite to the first surface in the target space, and
   wherein the second driving-type working device is configured to work by recognizing the first driving-type working device working on the first surface.

9. The location measuring system of claim 1, wherein the sensor comprises a path tracking detector, and wherein the path tracking detector comprises a camera or an image sensor.

10. The location measuring system of claim 1, wherein the sensor comprises a path tracking detector configured to detect a texture or pattern on a floor surface or wall surface of the target space.

* * * * *